US006758609B2

(12) United States Patent
Fathi et al.

(10) Patent No.: US 6,758,609 B2
(45) Date of Patent: Jul. 6, 2004

(54) METHODS AND APPARATUS OF JOINING OPTICALLY COUPLED OPTOELECTRONIC AND FIBER OPTIC COMPONENTS USING ELECTROMAGNETIC RADIATION

(75) Inventors: Zakaryae Fathi, Raleigh, NC (US); William L. Geisler, Chapel Hill, NC (US); Joseph M. Wander, Chapel Hill, NC (US); Iftikhar Ahmad, Raleigh, NC (US); Richard S. Garard, Chapel Hill, NC (US)

(73) Assignee: Lambda Technologies, Morrisville, NC (US)

( * ) Notice: Subject to any disclaimer, the term of this patent is extended or adjusted under 35 U.S.C. 154(b) by 42 days.

(21) Appl. No.: 10/167,551

(22) Filed: Jun. 11, 2002

(65) Prior Publication Data

US 2003/0228114 A1 Dec. 11, 2003

(51) Int. Cl.[7] .............................................. G02B 6/255
(52) U.S. Cl. .......................................... 385/91; 385/98
(58) Field of Search .............................. 385/95–99, 90, 385/91; 219/121

(56) References Cited

U.S. PATENT DOCUMENTS

| 3,701,875 A | 10/1972 | Witsey et al. ............. 219/10.81 |
| 4,487,475 A | * 12/1984 | Ogawa ......................... 385/95 |

(List continued on next page.)

FOREIGN PATENT DOCUMENTS

| EP | 553606 A1 | * 8/1993 | ............ G02B/6/38 |
| EP | 1039318 A2 | * 9/2000 | ........... G02B/6/255 |
| JP | 07-43547 | 2/1995 | |

OTHER PUBLICATIONS

Joseph Ting, "New Techniques Align Fibers," Test & Measurement World, May, 2001.

Kamran Mobarhan, Ph.D., "Aligning Fibers to Devices Demands Precision," WDM Solutions, Aug., 2001.

Teodor Cotruta, "Optical Interoperability: Why We Need It, How We Get It," Lightwave Magazine, Oct. 2000.

Primary Examiner—Hemang Sanghavi
Assistant Examiner—Scott A Knauss
(74) Attorney, Agent, or Firm—Myers Bigel Sibley & Sajovec

(57) ABSTRACT

In-situ and post-cure methods of joining optical fibers and optoelectronic components are provided. An in situ method of joining an optical fiber to an optoelectronic component includes positioning an optical fiber and optoelectronic component in adjacent relationship such that light signals can pass therebetween, applying a curable resin having adhesive properties to an interface of the optical fiber and the optoelectronic component, aligning the optical fiber and optoelectronic component relative to each other such that signal strength of light signals passing between the optical fiber and the optoelectronic component is substantially maximized, and irradiating the interface with non-ionizing radiation in RF/microwave energy to rapidly cure the resin. A post-cure method of joining an optical fiber to an optoelectronic component includes positioning an optical fiber and optoelectronic component in adjacent relationship such that light signals can pass therebetween, applying a curable resin having adhesive properties to an interface of the optical fiber and the optoelectronic component, aligning the optical fiber and optoelectronic component relative to each other such that the signal strength of light signals passing between the optical fiber and the optoelectronic component is substantially maximized, and irradiating the interface with microwave energy to partially cure the resin. The joined components are then transferred to a curing oven to fully cure the adhesive resin.

55 Claims, 5 Drawing Sheets

U.S. PATENT DOCUMENTS

| | | | |
|---|---|---|---|
| 4,636,033 A | 1/1987 | Gagen | 350/96.21 |
| 4,784,458 A | 11/1988 | Horowitz et al. | 350/96.21 |
| 5,163,108 A | 11/1992 | Armiento et al. | 385/89 |
| 5,182,134 A | 1/1993 | Sato | 427/543 |
| 5,247,147 A | 9/1993 | Boniort et al. | 219/10.55 |
| 5,659,972 A | 8/1997 | Min et al. | 34/255 |
| 5,774,614 A | 6/1998 | Gilliland et al. | 385/88 |
| 5,857,049 A | 1/1999 | Beranek et al. | 385/91 |
| 6,152,072 A | 11/2000 | Barmatz et al. | 118/723 |
| 6,164,837 A | 12/2000 | Haake et al. | 385/90 |
| 6,174,092 B1 | 1/2001 | Siala | 385/91 |
| 6,217,232 B1 | 4/2001 | Duesman et al. | 385/88 |
| 6,253,011 B1 | 6/2001 | Haake | 385/52 |
| 6,280,100 B1 | 8/2001 | Haake | 385/73 |
| 6,298,192 B1 | 10/2001 | Yoo et al. | 385/137 |
| 6,302,593 B1 | 10/2001 | Haake | 385/74 |
| 6,303,166 B1 * | 10/2001 | Kolbe et al. | 426/237 |
| 6,414,262 B1 | 7/2002 | Rao | 219/121.63 |
| 6,599,957 B2 * | 7/2003 | Dawes et al. | 522/149 |
| 2002/0135105 A1 * | 9/2002 | Easter | 264/474 |
| 2003/0016922 A1 | 1/2003 | DeMartino et al. | 385/98 |

* cited by examiner

METHODS AND APPARATUS OF JOINING OPTICALLY COUPLED OPTOELECTRONIC AND FIBER OPTIC COMPONENTS USING ELECTROMAGNETIC RADIATION

FIELD OF THE INVENTION

The present invention relates generally to optoelectronic and fiber optic components and, more particularly, to methods of joining optically coupled optoelectronic and fiber optic components.

BACKGROUND OF THE INVENTION

Optoelectronic and fiber optic components (collectively referred to hereinafter as "optoelectronic components") convert electrical signals to visible or infrared radiation and/or vice-versa and/or serve as a waveguide for visible or infrared radiation. Examples of optoelectronic components include optical fibers, light guides, fiber optic connectors, fiber arrays, dense wavelength division multiplexers (DWDM), arrayed wave guides (AWG), couplers, lenses, gratings, filters, tunable lasers, vertical cavity surface emitting lasers (VCSEL), transmitters, receivers, transceivers, switches, modulators, routers, cross-connects, optomechanical switches, electro-optical switches, wavelength converters, repeaters, regenerators, optical amplifiers, optical sensors, photocells, solar cells, optoisolators, LEDs (light-emitting diodes), laser diodes, etc. Optoelectronic devices play an increasingly important role in many areas including telecommunications, photovoltaic power supplies, monitoring and control circuits, computer storage, optical fiber communications, medical devices, etc.

It is generally considered critical that optoelectronic components be assembled with high precision to assure proper optical alignment (referred to as optical "coupling"). In order to effectively couple optical signals between optical fibers and/or between optical fibers and other optical components, a fiber optic connector must maintain the precise alignment of the individual optical fibers in a predetermined manner such that the optical fibers will remain aligned as the fiber optic connector is mated with another fiber optic connector or with other types of optical devices. Conventional assembly techniques for joining optical fibers and/or components utilize a curable adhesive (e.g., epoxy) to attach optical fibers to a substrate.

The primary role of adhesives is to enable assembling complex shapes of similar or dissimilar materials. Of equal importance is the reliability of the joint/bond enabled by the adhesive chemistry. Adhesive selection is based on various criteria including the ability to provide a reliable joint over the life expectancy of the optoelectronic product and the ability to sustain environmental exposure during the operational life of the optoelectronic product. Some of the key adhesive properties guiding adhesive selection include: coefficient of thermal expansion, glass transition temperature, fracture toughness, modulus, moisture up-take, adhesive strength, cure shrinkage, viscosity and optical properties.

There are two main categories of adhesives used in optoelectronic packaging: reactive systems (referred to hereinafter as "thermal cure adhesives") and photo-polymerizing systems (referred to hereinafter as "UV-curable adhesives"). Both types of adhesives require curing. Thermal cure adhesives require heat and UV-curable adhesives require a combination of ultraviolet (UV) radiation and heat. However, the properties of these two types of adhesives are different.

Thermal cure adhesives are typically more stable post-cure than UV-curable adhesives and typically result in less moisture pick-up and better mechanical properties. Unfortunately, thermal cure adhesives may require a long cure time. In contrast, UV-curable adhesives cure much faster than thermal cure adhesives. Accordingly, UV-curable adhesives are often the preferred choice for rapid assembling of optoelectronic components. In operation, optoelectronic components are joined to create an assembly, an adhesive is applied to an interface between the components, and then the components are aligned and exposed to UV radiation to partially cure the adhesive prior to moving the assembly to a thermal cure station for completion of the cure.

A limitation of UV-curable adhesives is that line of sight is required for UV radiation to reach an adhesive to be cured in order to trigger the photo-initiators responsible for cure. Unfortunately, special design configurations of optoelectronic component assemblies may obstruct light paths, thereby creating a shadow at an interface. The shadowing effect may result in poor curing of the adhesive.

To align optoelectronic components being assembled, a light source (e.g., a laser) transmits light through the optoelectronic components being assembled and a photodetector measures the amount of light passing therethrough. The positions of the optoelectronic components are incrementally adjusted relative to each other (typically via mechanical nano-positioner devices) until the light transmitted therethrough reaches a maximum (i.e., when exact alignment is achieved), at which time, the optoelectronic components are "tacked" together in the aligned position by partially curing an adhesive at the interface (or joint) of the optoelectronic components. This partial curing is conventionally performed by irradiating the adhesive resin with UV radiation or with heat in the case of thermal cure adhesives such as epoxies.

Since the curing of thermal adhesives can cause movement of optoelectronic components relative to each other, alignment of optoelectronic components must be maintained during the curing process. Unfortunately, conventional adhesive resins may take a relatively long period of time to fully cure, which may increase the likelihood that misalignment will occur. In addition, UV-curable adhesive resins may absorb moisture that may cause deterioration of the adhesive and lead to loss of component alignment during subsequent use of the optoelectronic device. Also, conventional adhesive resin curing techniques may produce residual stresses in bonds between optoelectronic components that may cause undesirable creep and misalignment between adhesively joined optoelectronic components.

With the ever-increasing demand for optoelectronic components, there is a need for rapid, cost-effective methods of aligning and joining optoelectronic components for both in-situ and post curing processes. Furthermore, an adhesive curing method/technology that combines both in-situ and post curing is needed.

SUMMARY OF THE INVENTION

In view of the above discussion, both in-situ and post-cure methods of joining optoelectronic components such that they are optically coupled are provided. Methods according to the present invention may be utilized to join various types of optoelectronic components (e.g., optical fibers in adjacent end-to-end relationship, optical fibers to the active regions of various optoelectronic components, etc.)

An in-situ method of joining optoelectronic components according to an embodiment of the present invention includes positioning optoelectronic components in adjacent relationship such that light signals can pass therebetween, applying a curable resin having adhesive properties to an interface of the optoelectronic components, passing light signals between the optoelectronic components, aligning the optoelectronic components relative to each other such that the signal strength of light signals passing between the optoelectronic components is substantially maximized, and irradiating the interface with electromagnetic radiation to rapidly cure the resin such that the aligned optoelectronic components are fixedly joined. Irradiating the interface with electromagnetic radiation may include irradiating with non-ionizing radiation in the Radio Frequency (RF) and microwave regimes, according to embodiments of the present invention. Electromagnetic radiation can be applied using various applicators according to embodiments of the present invention, including fixed frequency, single mode microwave applicators, RF stray field applicators, capacitive heating applicators, and a variable frequency microwave (VFM) applicators. Moreover, microwave energy and RF energy can be used interchangeably.

Microwave applicators according to embodiments of the present invention may deliver single frequency RF and/or microwave energy, and may be configured to sweep with one or more ranges of RF and/or microwave frequencies selected to rapidly cure a resin, and may include the combination of single and variable frequency microwave energy, as well as a combination of RF and microwave energy.

A fixed frequency single mode microwave applicator, according to embodiments of the present invention, is equipped with an access port and door cut along a zero current, maximum field line. The access door enables access to the applicator cavity without disturbing the fundamental mode of heating. Furthermore, the terminations of a single mode applicator may be equipped with two plungers, one on each end, to increase the stability of the fundamental modes while enabling nano-positioning/alignment to take place. According to embodiments of the present invention, mode switching techniques can be used to target specific areas of a single mode applicator. Mode switching, according to embodiments of the present invention, can be performed through mechanical means (such as cavity dimensional changes) or through electronic means (such as changing incident frequencies).

The effective dimension of a single mode applicator can mechanically be changed through the use of plungers. A plunger is electrically connected with a cavity and is capable of linear travel to change the effective length of an applicator. The incident power can also be adjusted accordingly. Furthermore, microwave energy injected in a cavity at a given frequency or mechanical plunger set-up may be different from the energy injected inside the cavity at a different frequency or a different mechanical plunger set-up.

An RF stray field applicator, according to embodiments of the present invention, can be adjustable to various optoelectronic component assemblies. Electrodes of the RF stray field applicator can be dynamically adjusted during the cure process to localize and intensify the electric field at targeted positions/locations.

A capacitive heating applicator, according to embodiments of the present invention, utilizes capacitive plates that are interchangeable. The capacitive plates are adjustable to target different areas at different process times.

Methods and apparatus, according to embodiments of the present invention, are advantageous over conventional adhesive curing methods and apparatus for at least the following reasons: adhesives can be subjected to a controlled application of electromagnetic radiation, such as RF and/or microwave energy; the absorption of electromagnetic radiation within an optoelectronic component assembly can be controlled to selectively begin adhesive curing at predetermined areas; alignment of optoelectronic components can be controlled either simultaneously or sequentially with the application of electromagnetic radiation; alignment of optoelectronic components achieved during in-situ alignment can be maintained during post cure; and predetermined electromagnetic radiation process recipes can be utilized to optimize optical coupling for optoelectronic component assemblies that require post curing after in-situ UV curing.

Component alignment and electromagnetic radiation processing may occur substantially simultaneously according to embodiments of the present invention. According to other embodiments of the present invention, component alignment and electromagnetic radiation processing may occur sequentially. For example, alignment may occur to position the optoelectronic components in an optically coupled position, followed by electromagnetic radiation processing to partially cure the adhesive. Alignment techniques may be invoked again to verify that the optoelectronic components are still aligned or to reposition the optoelectronic components to an aligned position, followed by electromagnetic radiation processing to further cure the adhesive. This sequential pattern of aligning then applying electromagnetic radiation may be repeated numerous times until the optoelectronic components are permanently attached in the position that optimizes optical coupling.

According to embodiments of the present invention, portions of an optoelectronic component may be additionally heated via the use of susceptor material that is configured to heat to a predetermined temperature in the presence of electromagnetic radiation. Selective electromagnetic radiation causes susceptor material to heat to a predetermined temperature which, in turn, heats portions of an optoelectronic component to a predetermined temperature to facilitate curing of the adhesive resin. According to embodiments of the present invention, susceptor material may be added to portions of a positioning apparatus that holds/aligns optoelectronic components during electromagnetic radiation processing. For example, a gripping device may include one or more fluids (or other materials) in one or more portions thereof that is a susceptor material. A gripping device may also include susceptor material in a solid state.

According to embodiments of the present invention, fluid can be exchanged or drained from a gripping device to gain an additional degree of process control. For example, two fluid reservoirs may be utilized (e.g., one filled with a susceptor fluid such as a polar fluid, and one filled with a non-susceptor fluid, such as a non-polar fluid). Electromagnetic radiation can be applied while specific parts of the alignment set up can be made to heat or to cool during processing. Fluid heating or cooling during electromagnetic radiation exposure is not limited to the above described embodiments. Moreover, the term fluid is intended to include gases, liquids, slurries, etc.

A microwave absorbing gripper tool, according to embodiments of the present invention, may include internal polar fluid that is used to preheat an optoelectronic component assembly. The polar fluid may be drained to enable the microwave energy to focus on the optoelectronic assembly. A secondary fluid may be introduced to maintain temperature without interfering with the overall dielectric loading of the cavity. This may be especially beneficial in the case of single mode processing.

According to embodiments of the present invention, a secondary, non-polar fluid may be used for controlled cooling of an adhesive joint area. This can be achieved by introducing the non-polar fluid from a reservoir of known and controlled temperature. According to embodiments of the present invention, solid materials such as silicon carbide may be utilized as a microwave susceptor material.

A post-cure method of joining optoelectronic components according to an embodiment of the present invention includes positioning first and second optoelectronic components in adjacent relationship such that light signals can pass therebetween, applying a curable resin having adhesive properties to an interface of the optoelectronic components, passing light signals between the optoelectronic components, aligning the optoelectronic components relative to each other such that the signal strength of light signals passing between the optoelectronic components is substantially maximized, and irradiating the interface with electromagnetic radiation (e.g., RF and/or microwave energy) to partially cure the resin. The joined optoelectronic components are then transferred to a curing oven to fully cure the adhesive resin via either conventional techniques or via the application of electromagnetic radiation (e.g., RF and/or microwave energy).

According to embodiments of the present invention, a curing oven may be a conventional thermal oven, and the partially cured adhesive resin may be subjected to thermal heating at a predetermined temperature for a predetermined period of time. According to embodiments of the present invention, a curing oven may include a capacitive heating device, and the partially cured adhesive resin may be subjected to energy generated between a pair of parallel capacitive plates. According to embodiments of the present invention, a curing oven may include one or more RF stray field electrodes, and the partially cured adhesive resin may be subjected to a stray field of RF energy.

RF/microwave processing in accordance with embodiments of the present invention is advantageous over conventional thermal processing for numerous reasons. RF/microwave processing is rapid and selective. RF/microwave processing reduces the effects of viscous drag during curing which can lead to misalignment.

Good post cure results can be obtained when an optoelectronic component assembly is processed according to predefined curing "recipes". For example, curing involving multistage heating and ramp rate adjusting between various heat soaking stages in variable frequency microwave (VFM) processing may minimize optoelectronic component movement compared with conventional convection curing techniques. Multistage heating may be tailored around the adhesive involved in the assembly process. Once the gel stage of the adhesive is identified, the VFM curing recipe is adjusted such that relaxation of the adhesive due to an increase in stresses is circumvented. In convection heating, achieving a given thermal stage is done slowly which may induce undesirable relaxations. These relaxations along with the thermal expansion that takes places in the materials forming the optoelectronic component assembly may result in the undesirable loss of alignment. VFM processes may lead to higher post cure process yields than convection heating because VFM facilitates rapid cure and selective heating of an optoelectronic component forming a given assembly.

According to embodiments of the present invention, electromagnetic radiation (e.g., RF and/or microwave energy) applicators are equipped with closed-loop feedback on temperature for proper process control. Measured temperature is computed to derive a heating rate. The heating rate is fed back to an electromagnetic radiation generator, which in turn delivers more or less electromagnetic radiation power, according to a programmed heat rate (recipe). Both contact and non-contact temperature monitoring systems may be used to measure temperature. Non-contact temperature monitoring systems, such as IR pyrometers, do not interfere with sensitive optoelectronic components to be aligned.

According to embodiments of the present invention, a microwave single mode applicator includes a housing that defines a microwave cavity. The housing has an access port formed therethrough through which optoelectronic components can be inserted into and removed from the cavity. The access port has a contour of a zero current line for the microwave cavity. An access door is movably mounted to the housing and is configured to be opened to permit access to the cavity via the access port. The housing also includes opposite first and second end portions with first and second plungers movably mounted within the first and second end portions respectively. Movement of the first and second plungers changes the physical dimensions of the cavity.

According to embodiments of the present invention, an optoelectronic component assembly system is provided that includes a microwave applicator having a housing that defines a cavity, a source of microwave energy configured to deliver microwave energy to the cavity, a positioning apparatus configured to align optoelectronic components in relation with each other within the cavity, an optical source configured to pass light signals between optoelectronic components being aligned by the positioning apparatus, and an optical detector configured to detect signal strength of light signals passing between the optoelectronic components. The microwave applicator housing has an access port formed therethrough through which optoelectronic components can be inserted into and removed from the cavity. The access port has a contour of a zero current line for the microwave cavity. An access door is movably mounted to the housing and is configured to be opened to permit access to the cavity via the access port. The housing also includes opposite first and second end portions with first and second plungers movably mounted within the first and second end portions respectively. Movement of one or both of the first and second plungers changes the physical dimensions of the cavity.

According to embodiments of the present invention, an RF stray field applicator is provided that includes an array of stray field electrodes configured to generate a stray field of RF energy, and wherein the electrodes in the array are movable relative to each other so that the electrodes can maintain a predetermined distance from a surface of a three-dimensional object to which a stray field of RF energy is to be applied. A distance between adjacent electrodes in the array may also be adjustable.

According to embodiments of the present invention, an optoelectronic component assembly system includes an RF stray field applicator, a positioning apparatus associated with the RF stray field applicator that is configured to align optoelectronic components in relation with each other, an optical source configured to pass light signals between optoelectronic components being aligned by the positioning apparatus, and an optical detector configured to detect signal strength of light signals passing between the optoelectronic components. The RF stray field applicator includes an array of stray field electrodes configured to generate a stray field of RF energy. The electrodes in the array are movable relative to each other so that the electrodes can maintain a predetermined distance from a surface of a three-dimensional optoelectronic component assembly to which a stray field of RF energy is to be applied. A distance between adjacent electrodes in the array may also be adjustable.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
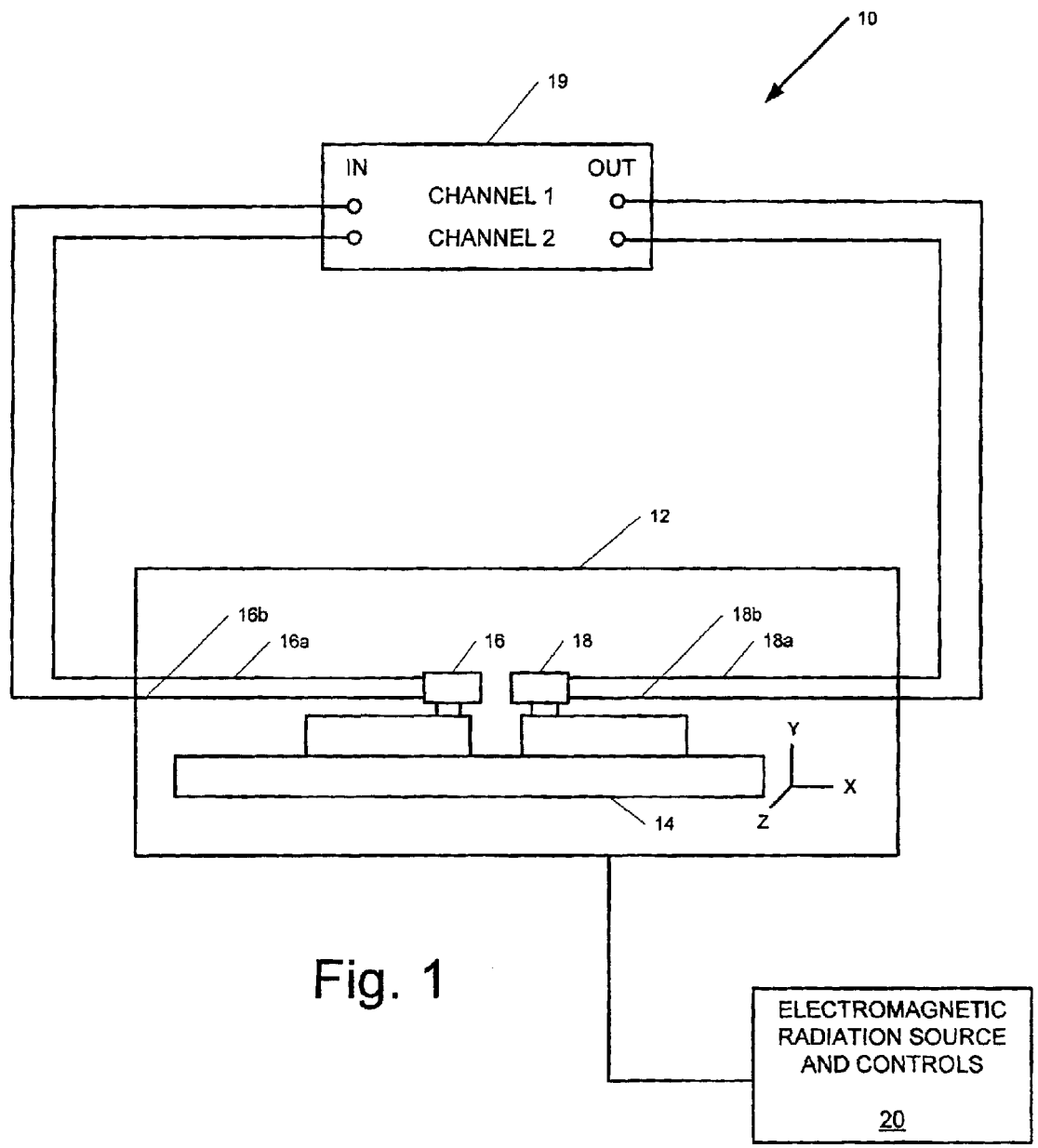
FIG. 1 illustrates an optoelectronic component assembly system that may be utilized to carry out embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of lines, layers and regions, as well as scale, may be exaggerated for clarity. The drawings may not be to scale.

In-Situ Processing

Referring to FIG. 1, an optoelectronic component assembly system 10 that may be utilized to carry out in-situ curing embodiments of the present invention is illustrated schematically. The assembly system 10 includes an electromagnetic radiation applicator having a cavity 12 and a positioning apparatus 14 that is configured to align optoelectronic components 16, 18 in relation with each other within the microwave cavity 12. The optoelectronic components may include, but are not limited to, optical fibers that are joined together or optoelectronic components having an active region that is being joined with one or more optical fibers. The positioning apparatus 14 may be configured to move the optoelectronic components relative to each other in up to six degrees of freedom (e.g., along the X, Y and Z axes). An exemplary positioning apparatus that may be utilized in accordance with embodiments of the present invention are available from Adept Technology, Inc., San Jose, Calif.

In the illustrated embodiment, optical fibers 16a, 16b in the first optoelectronic component are to be joined with optical fibers 18a, 18b in the second optoelectronic component 18. An optical source and detector 19 is configured to pass light signals between the optical fibers 16a, 18a and 16b, 18b, and to detect signal strength of the light signals passing therebetween. Various devices for holding the optoelectronic components and moving the optoelectronic components into alignment can be utilized. Embodiments of the present invention are not limited to a particular device for positioning and aligning optoelectronic components.

An electromagnetic radiation applicator 20 provides electromagnetic radiation (e.g., RF and/or microwave energy) to the cavity 12. An exemplary microwave furnace which can serve as an electromagnetic radiation applicator 20 is described in U.S. Pat. No. 5,321,222, to Bible et al., the disclosure of which is incorporated herein by reference in its entirety. Particularly preferred microwave furnaces having a cavity and microwave source for carrying out embodiments of the present invention are the MicroCure® 2100 batch furnace, the MicroCure® 5100 in-line furnace, and the VariWave™ 1500 table top furnace, all available from Lambda Technologies, Morrisville, N.C.

In general, a microwave furnace for carrying out the present invention typically includes a microwave signal generator or microwave voltage-controlled oscillator for generating a low-power (i.e., between about 0.015 and 0.15 millivolts) microwave signal for input to the microwave cavity. A first amplifier may be provided to amplify the magnitude of the signal output from the microwave signal generator or the microwave voltage-controlled oscillator. A second amplifier may be provided for processing the signal output by the first amplifier.

A high-power broadband amplifier, such as, but not limited to, a traveling wave tube (TWT), tunable magnetron, tunable klystron, tunable twystron, and a tunable gyrotron, may be used to sweep a range of microwave frequencies of up to an octave in bandwidth and spanning a spectrum of from about 10 MHz to about 300 GHz. A range of microwave frequencies for curing adhesive resin, in accordance with embodiments of the present invention, may include virtually any number of frequencies, and is not limited in size.

A microwave applicator for curing adhesive resin, according to embodiments of the present invention, may be under computer control. Under computer control, a microwave furnace may be tuned to a particular frequency, preferably an optimum incident frequency for a particular adhesive resin, and then may be programmed to sweep around this central frequency to generate a plurality of modes and rapidly move them around a cavity to provide a uniform energy distribution. In addition, an optimum coupling frequency may change during the curing of adhesive resin. Accordingly, a central frequency may be adjustable, preferably under computer control, to compensate automatically for such changes.

Use of electromagnetic radiation processing, according to embodiments of the present invention, can enhance the cure kinetics of an adhesive and can lead to selective heating during processing. Electromagnetic radiation applicators 20 according to embodiments of the present invention will now be individually described.

Single Mode RF/Microwave Applicators

In single mode processing, a fundamental mode of energy propagation is excited to create a "hot zone" (i.e., a zone of high electric field intensity), the article to be processed is placed in the hot zone, the mechanical dimension of the cavity is then changed to maintain resonance (e.g., via a plunger). Power is then adjusted to heat the article at an appropriate ramp rate. Such practice enables maintaining the article in the hot zone during its heating phase. As the article heats up, its thermal and dielectric characteristics change. This change in the load characteristics may require additional mechanical tuning and power tuning to follow the desired thermal treatment.

Figure 3:
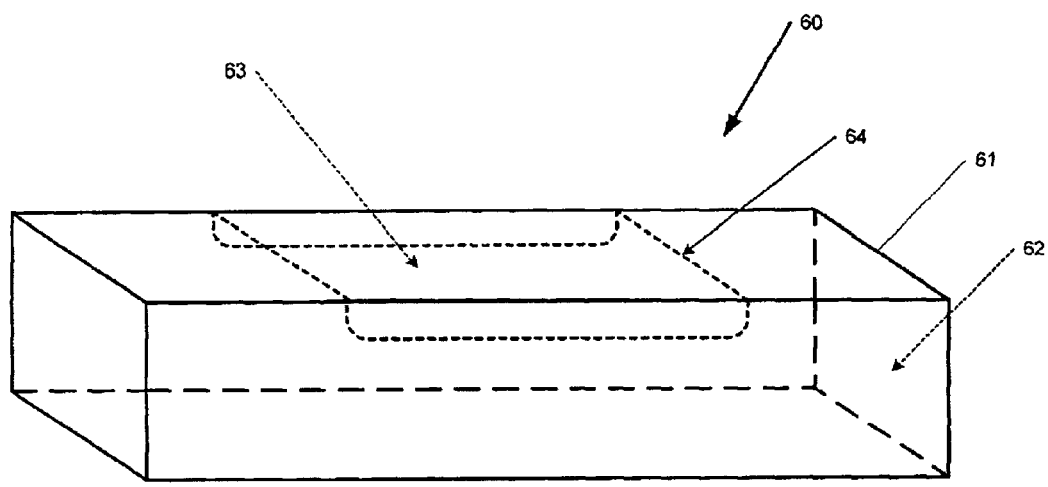
FIG. 3 is an enlarged, partial perspective view of the port and access door of the applicator of FIG. 2.
Figure 2:
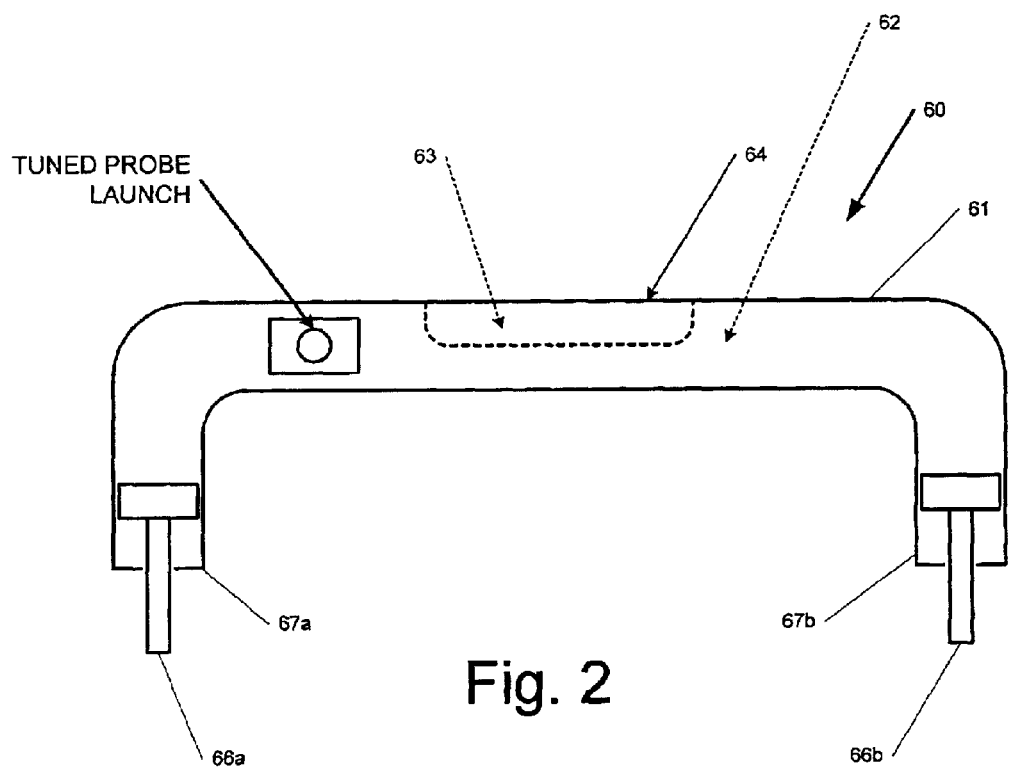
FIG. 2 illustrates a single mode microwave energy applicator according to embodiments of the present invention.

A single mode microwave energy applicator 60, according to embodiments of the present invention is illustrated in FIG. 2 and includes a housing 61 that defines a microwave cavity 62. The housing 61 has an access port 63 formed therethrough through which optoelectronic components can be inserted into and removed from the cavity 62. The access port 63 has a contour of a zero current line for the microwave cavity. An access door 64 is movably mounted to the housing 61 and is configured to be opened to permit access to the cavity 62 via the access port 63. FIG. 3 is an enlarged, partial perspective view of the port 63 and access door 64 of the applicator illustrated in FIG. 2.

By having the port 63 and access door 64 follow along the zero current line, minimal disruption of the currents that lead to the establishment of high intensity electric fields in the hot zone occurs. The access door 64 provides access to the single mode hot zone within the microwave cavity 62 without requiring the applicator 60 to be disassembled and without disturbing the location and/or the size of the hot zone.

In a closed position, gaps between the waveguide applicator at the access door 64 do not cause significant backscattering (reflection) which otherwise could affect the establishment or intensity of the desired fundamental mode. The access door 64 enables a single mode applicator to be practical and compatible with sophisticated, and often complex, optoelectronic component alignment tools.

The illustrated single mode microwave energy applicator 60 also includes two plungers 66a,66b that are movably mounted within respective end portions 67a,67b of the applicator 60 to change the physical dimensions of the cavity 62. The plungers 66a,66b are configured to sustain the hot zone within the microwave cavity 62 over large areas via movement within the respective end portions 67a,67b. The illustrated special single mode applicator 60 preferably is configured to accommodate a positioning device that positions and holds optoelectronic components in alignment as the adhesive is cured (or partially cured).

The plungers 66a,66b can be adjusted automatically using closed-loop feedback on microwave reflected power. The reflected power is a good indicator whether microwave resonance is sustained. In single mode operation, the reflected power is kept near zero; in other words, operation near a fundamental mode is performed near zero power reflection. Maximizing energy input into the cavity is achieved when the fundamental mode is excited.

The frequency at which a fundamental mode is excited shifts to lower frequency as an optoelectronic component assembly is heated. This is because the dielectric loss of an optoelectronic component assembly increases with temperature. As the dielectric loss assumes higher values, the single mode applicator appears electrically larger to operating frequencies. Therefore, frequencies with higher wavelengths are needed to maintain resonance.

Once an optoelectronic component assembly is placed in the single mode applicator 60, and once the access door 64 is closed to contain microwave energy, operation of the single mode applicator 60 is performed by coordinating closed-loop temperature feedback with various functions including frequency hopping (as needed), mechanical positioning of the plungers (as needed), power variation (as needed). This is done sequentially or simultaneously to the optical alignment needed for the dynamic maximization of optical coupling.

Stray Field Applicators

Figure 4:
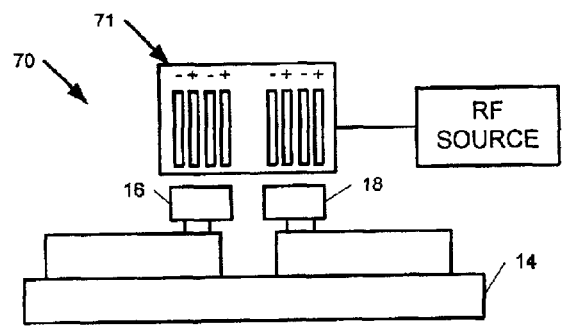
FIG. 4 illustrates an RF stray field applicator having electrodes for generating a stray field of RF energy to cure adhesive resin according to embodiments of the present invention.

FIG. 4 schematically illustrates a stray field applicator 70 having an array of stray field electrodes 71 for generating a stray field of RF energy. The electrodes 71 may be adjustable to conform to the dimensional configuration of an assembly of optoelectronic components. Stray field RF energy electrodes and operation thereof are well understood by those skilled in the art.

The illustrated stray field applicator 70 offers a high degree of flexibility in terms of tailoring the shape of the RF stray field around an optoelectronic component assembly being processed. The electrodes 71 are adjustable in four main degrees of freedom, x,y,z and θ (the swing angle). The electrodes 71 in the array are movable relative to each other so that each electrode 71 can maintain a predetermined distance from a surface of a three-dimensional object to which a stray field of RF energy is to be applied. Specifically, the electrodes 71 are adjustable within the plane and out of plane of an optoelectronic component assembly being processed. This adjustability enables the formation of a stray field that contours an optoelectronic component assembly.

Furthermore, the strength of the field lines can be modified by adjusting the distance between adjacent/neighboring electrodes 71 or by increasing the power between specific electrodes 71. Electrode adjustments can be performed automatically under computer control or manually.

According to embodiments of the present invention, the number of electrodes 71 used to generate the stray fields can be flexible (e.g., electrodes can be added or removed as suitable to the application). Accordingly, an operator can shape/tailor the strength of the electric field to selectively heat parts of an optoelectronic component assembly.

According to embodiments of the present invention, the electrodes 71 may be under computer control. For example, electrode configuration can be programmable and storable per optoelectronic component assembly type. Thus, electrode configuration can be recallable per optoelectronic component assembly type and programmable as part of the process recipe design for a given optoelectronic component assembly.

A non-contact temperature monitoring system (not shown) may be utilized to provide feedback on temperature. The closed-loop temperature feedback is used to adjust the magnitude of the RF power externally imposed on a given optoelectronic component assembly.

Once an optoelectronic component assembly is placed in the stray field applicator 70 and the electrodes 71 are positioned, the cure operation in the RF stray field applicator 70 is performed by coordinating closed-loop temperature feedback with various functions including mechanical repositioning of the electrodes (as needed) and CW power variation (as needed). This may be done sequentially or simultaneously with optical alignment of the components.

Capacitive Heating Applicators

Figure 5:
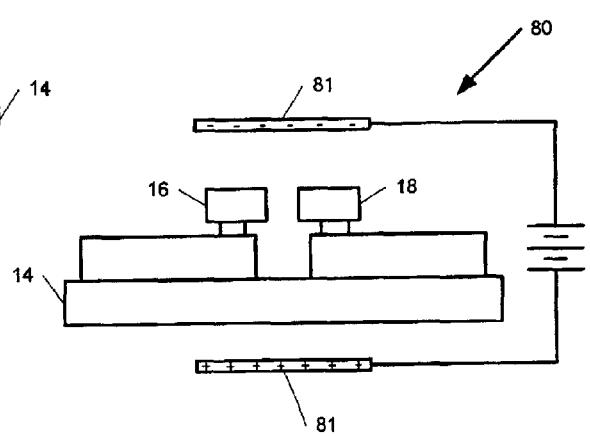
FIG. 5 schematically illustrates a pair of capacitor plates for generating electromagnetic energy to cure adhesive resin according to embodiments of the present invention.

A capacitive heating applicator 80 according to embodiments of the present invention is illustrated in FIG. 5 and includes parallel capacitive plates 81. The parallel capacitive plates 81 can sustain a high intensity electric field for curing adhesives in optoelectronic component assemblies. The size of the capacitive plates 81 is chosen such that a device is fully irradiated by the oscillating field. As known to those skilled in the art, the edges of capacitive plates inherently induce field aberrations that result in curved rather than straight field lines as in the case in the middle of the plate.

According to embodiments of the present invention, the capacitive plates 81 can be positioned around an assembly of optoelectronic components 18 in various configurations. If an optoelectronic component assembly contains metallic parts, the preferred configuration is to position the capacitive plates 81 parallel to the long side of the optoelectronic component assembly. If the optoelectronic component assembly does not contain metallic parts, then the configuration of the capacitive plates 81 is equally efficient in various directions.

According to embodiments of the present invention, capacitive plates may be provided as part of an optical alignment apparatus. However, the capacitive plates are preferably electrically isolated from the optical alignment apparatus. This may be accomplished by fixturing the capacitive plates into another pair of isolating plates, so that no electrical path continuity is allowed between the capacitive plates and other metallic components of the optical alignment apparatus.

According to embodiments of the present invention, interchangeable capacitive plates may be utilized wherein capacitive plates of different shapes and sizes may be utilized to accommodate various assemblies as required.

Once an optoelectronic component assembly is placed between the capacitive plates, the cure operation is performed by coordinating closed-loop temperature feedback with various functions including mechanical repositioning of the capacitive plates (as needed) and CW power variation (as needed). This may be done sequentially or simultaneously to the optical alignment needed for the dynamic maximization of optical coupling.

Variable Frequency RF/Microwave Applicators

Variable frequency microwave processing according to embodiments of the present invention may be achieved in a multimode applicator. A multimode applicator is a cavity that sustains multiple modes of energy propagation and storage. When a multimode RF/microwave cavity is energized within a given signal (frequency), multiple modes are established in the cavity according to its size and geometry. Typically in a one cubic foot cavity energized with a single frequency, the number of modes established is around 70 to 150 at any wavelength in the range of 12.5 cm to 5 cm. By contrast, the same size cavity may host in excess of 50,000 modes if the frequencies corresponding to wavelengths between 12.5 cm to 5 cm are swept with a step size of 200 KHz. The probability of interaction and modal heating of RF/microwave energy with a given article inside a multimode cavity powered with VFM is much greater than the probability of interaction and modal heating of RF/microwave energy with that same article when the cavity is powered with one frequency only.

VFM processing as disclosed herein, enhances uniform curing of adhesive resin used to join optoelectronic components because placement of the optoelectronic components within a microwave furnace cavity is not critical. By contrast, with single frequency microwave processing in multimode cavities, optoelectronic components having similar geometry may need to be oriented the same way within the furnace cavity to achieve identical and repeatable curing time and quality. This is because single frequency microwave processing creates hot spots within a cavity that may overheat particular areas without heating other areas.

Figure 6:
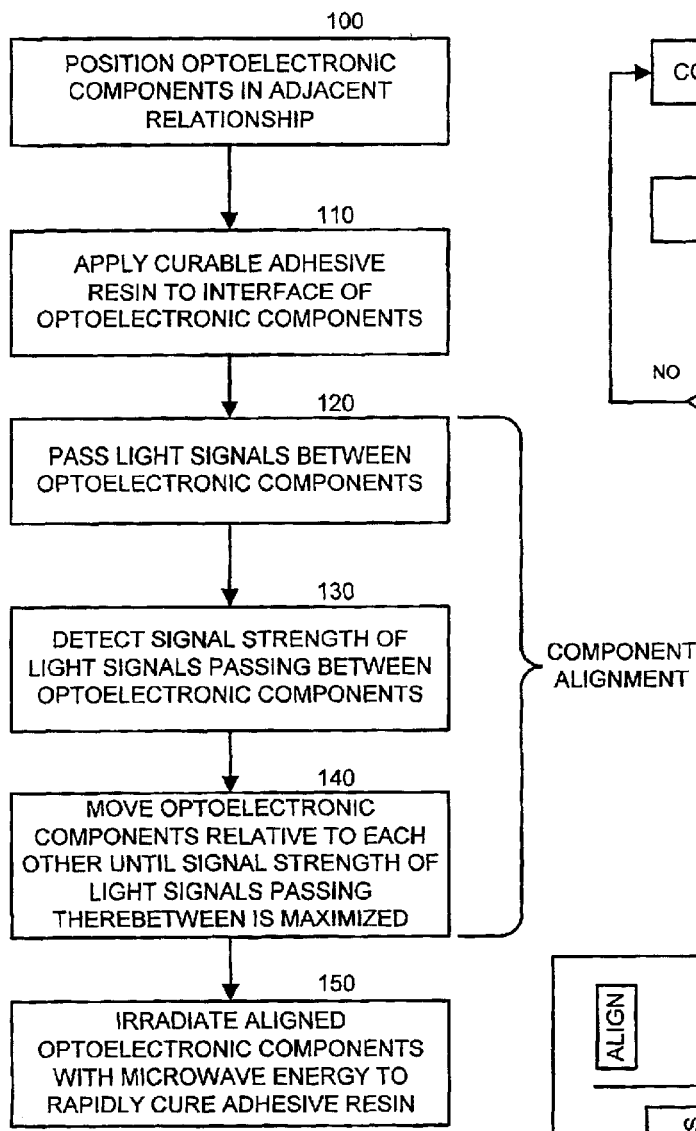
FIG. 6 is a flow chart of operations for joining optoelectronic components such that the optoelectronic components are optically coupled according to embodiments of the present invention.

Referring to FIG. 6, operations for utilizing VFM to join optoelectronic components such that the optoelectronic components are optically coupled are illustrated. However, it is understood that the same operations may be utilized for single mode microwave heating, stray field heating, and capacitive heating.

Optoelectronic components are initially positioned in adjacent relationship such that light signals can pass therebetween (Block 100). The optoelectronic components may include, but are not limited to, optical fibers (e.g., two optical fibers positioned in adjacent end-to-end relationship). The optoelectronic components may include active regions (a light-receiving or light-generating surface), with the ends of optical fibers positioned in adjacent relationship with the optoelectronic component active regions, etc.

A curable resin having adhesive properties is applied to an interface of the optoelectronic components (Block 110). Light signals are then passed between the optoelectronic components (Block 120) such that the optoelectronic components can be aligned relative to each other. Alignment operations include, detecting signal strength of the light signals passing between the optoelectronic components (Block 130), and moving the optoelectronic components relative to each other until signal strength of the light signals passing between the optoelectronic components is detected as being substantially maximized (Block 140).

In response to detecting that signal strength of the light signals passing between the optoelectronic components is substantially maximized, the interface is irradiated with microwave energy to rapidly cure the adhesive resin such that the aligned optoelectronic components are fixedly joined (Block 150). As described above, the curing operation of Block 150 may also be performed by a single mode applicator, stray field applicator, and capacitive heating applicator.

Irradiating the interface with microwave energy may include the use of single frequency microwave energy, may include sweeping the interface with one or more ranges of microwave frequencies (i.e., variable frequency microwave energy), and may include the combination of single and variable frequency microwave energy. The application of microwave energy may only be required for a period of time between about 20 seconds and about 600 seconds, which is dramatically shorter than required for conventional curing techniques using thermal heat.

Though thermally curable adhesives may provide better post-cure properties, some applications may require the use of UV curable adhesives. As described above, even UV-curable adhesives may need thermal heat to drive the reactions to near full completion. For this reason, UV curing may be used in parallel with microwave curing in some cases. The microwave energy and the UV energy can co-exist in a microwave applicator, provided the microwave applicator has adequate shielding for the UV source. It is also possible to use UV curing with the other RF/microwave applicators described herein (i.e., stray field applicator, capacitive heating applicator, single mode applicator).

The practical range of frequencies within the electromagnetic spectrum from which microwave frequencies may be chosen is generally about 0.4 GHz to 90 GHz. Every adhesive resin typically has at least one range of microwave frequencies that is optimum for curing without damaging the optoelectronic components being joined and without damaging other components to which the optoelectronic components are attached. Furthermore, the use of variable frequency microwave energy allows optoelectronic components (and other components to which the optoelectronic components are attached) to be subjected to microwave energy without arcing or causing other damage which might be the case when exposed to single frequency microwave energy. Each range of microwave frequencies preferably has a central frequency that is optimum for curing a specific adhesive resin. The central frequency of each range is bounded on one end by a specific frequency and bounded on an opposite end by a different specific frequency.

Damage from arcing can occur when microwave energy is applied to conductive materials. However, arcing typically occurs only within certain ranges of microwave frequencies. Other ranges of microwave frequencies typically exist wherein arcing does not occur. By selecting one or more ranges of damage-free frequencies, curing can be performed on optoelectronic components using microwave energy without concern for damage from arcing, even where optoelectronic components (and other components to which the optoelectronic components are attached) contain conductive materials. Furthermore, a sweeping rate in a particular range of frequencies may also be selected to avoid damage to an optoelectronic components (and to other components to which the optoelectronic components are attached).

Each range of microwave frequencies preferably has a central frequency that is selected to rapidly perform adhesive resin curing. This means that the selected frequency offers the best match and is likely to be the frequency at which the adhesive resin is at or near maximum absorption of microwave energy (microwave coupling). Microwave energy couples at the molecular level with the material to which it is applied producing volumetric electromagnetic and thermal energy distribution within the material.

Often there are multiple ranges of frequencies within which curing may occur without causing damage to optoelectronic components (and other components to which the optoelectronic components are attached). For example, damage-free curing may occur between 3.50 GHz and 6.0 GHz, and may also occur between 7.0 GHz and 10.0 GHz. The availability of additional ranges provides additional flexibility for achieving rapid, uniform, yet damage-free curing. The availability of alternative ranges permits curing to be achieved with microwave energy without having to resort to other curing methods. The availability of multiple ranges of frequencies also permits "hopping" between two or more ranges during microwave processing to obtain optimum curing. For example, optimum curing of a particular adhesive resin may be obtained by sweeping with microwave frequencies between 3.50 GHz and 6.0 GHz for a period of time and then sweeping, for a period of time, between 7.0 GHz and 10.0 GHz. Hopping may also be advantageous for curing multiple resins at the same time. For example, one range may be optimum for curing one resin and another range may be optimum for curing another resin.

Preferably, frequency sweeping is performed using frequencies from within at least one range of frequencies, as described above. Frequency sweeping facilitates uniform curing because many cavity modes can be excited. Frequency sweeping may be accomplished by launching the different frequencies within a range either simultaneously, or sequentially. For example, assume a range of frequencies is 2.60 GHz to 7.0 GHz. Frequency sweeping would involve continuously and/or selectively launching frequencies within this range in any desirable increments, such as 2.6001 GHz, 2.6002 GHz, 2.6003 GHz . . . 3.30 GHz, etc. Virtually any incremental launching pattern may be used without departing from the spirit and intent of the present invention.

In the case of VFM processing, the rate at which the different frequencies are launched is referred to as the sweep rate. This rate may be any value, including, but not limited to, milliseconds, and minutes. Preferably, a sweep rate is as rapid as practical. In addition, a sweep rate may be selected so that an optimum number of modes are generated within a microwave furnace cavity. Sweep rate may also be selected based on the adhesive resin to be cured.

The uniformity in curing afforded by frequency sweeping provides flexibility in how optoelectronic components are oriented within a microwave furnace, and permits a plurality of optoelectronic components to be processed at the same time. Maintaining each optoelectronic component in precisely the same orientation is not required to achieve uniform curing.

Figure 7:
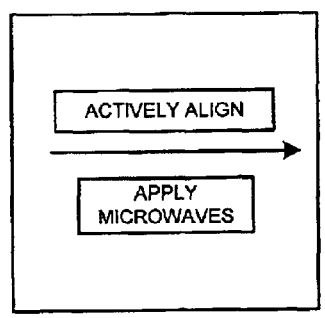
FIG. 7 illustrates aligning optoelectronic components and applying electromagnetic radiation substantially simultaneously.

Component alignment and microwave processing may occur substantially simultaneously according to embodiments of the present invention (FIG. 7). For example, the process described above of detecting light passing through optoelectronic components may occur at the same time that microwave energy is applied to cure the adhesive resin.

Figure 8:
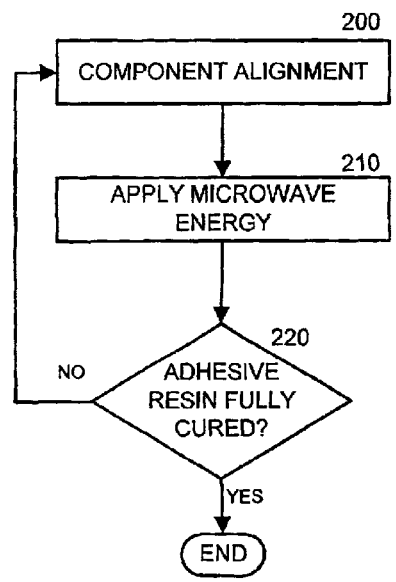
FIG. 8 is a flow chart of operations for optically aligning optoelectronic components and subjecting the optoelectronic components to non-ionizing radiation in the RF/microwave regime in a sequential pattern according to embodiments of the present invention.
Figure 9:
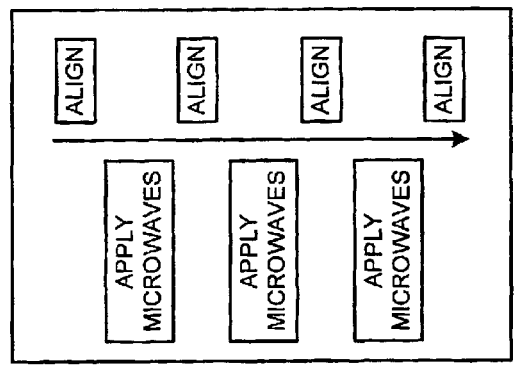
FIG. 9 illustrates a sequential pattern of aligning optoelectronic components and applying microwave energy.

Microwave energy processing may interfere with passing and detecting of light signals in certain situations. As such, according to embodiments of the present invention, component alignment and microwave processing can occur in a sequential pattern. For example, as illustrated in FIG. 8, component alignment (Block 200) may occur first to position optoelectronic components in an aligned position, followed by microwave processing (Block 210). If the adhesive resin is not fully cured (Block 220), operations of Block 200 and 210 are repeated. For example, component alignment may occur again to verify that the optoelectronic components are still aligned or to reposition the optoelectronic components to an aligned position, followed by microwave processing to further cure the adhesive. This pattern of aligning then microwave processing may repeat for numerous sequential iterations is illustrated in FIG. 9.

Figure 10:
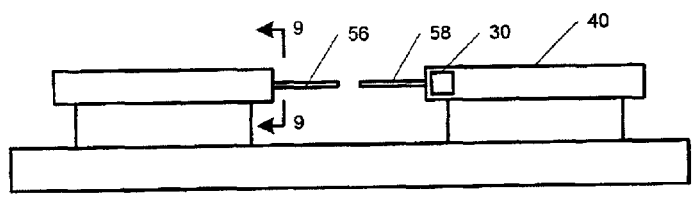
FIGS. 10–11 illustrate positioning devices for aligning optoelectronic components according to embodiments of the present invention wherein microwave susceptor material is located on various portions thereof (FIG. 10) and within various portions thereof (FIG. 11).
Figure 11:
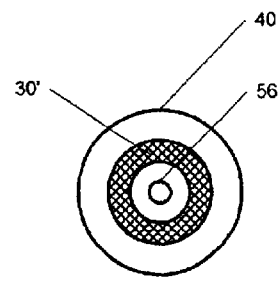

According to embodiments of the present invention, portions of an optical fiber and/or optoelectronic component may be heated via the use of microwave susceptor material that is configured to heat to a predetermined temperature in the presence of microwave energy. For example, as illustrated in FIG. 10, microwave susceptor material 30 may be applied to the external surface of various portions of an alignment device 40 used to align optoelectronic components 56, 58. As illustrated in FIG. 11, microwave susceptor material (e.g., a fluid) 30' may be disposed within one or more portions of an alignment device 40. Microwave susceptor materials can be liquids, slurries or solids as described herein. Fluid susceptors include highly polar liquids and solid susceptors include materials with high effective dielectric constant in the RF/microwave regime. The effective dielectric constant has 2 main components, space charge polarization and orientation polarization. Microwave susceptors are known to those skilled in the art and need not be described further herein.

Post-Cure Processing

Figure 12:
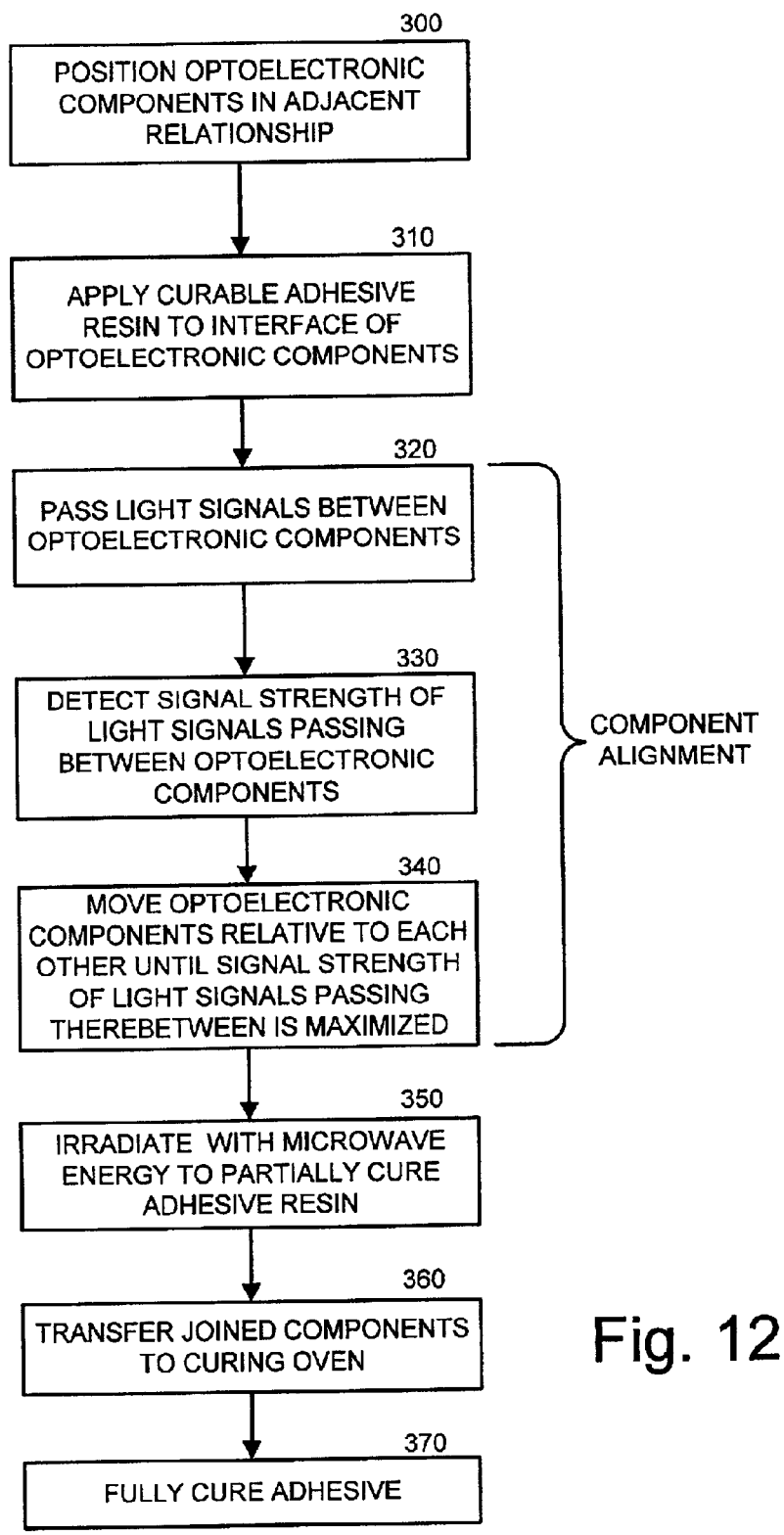
FIG. 12 is a flow chart of operations for joining optoelectronic components such that the optoelectronic components are optically coupled according to embodiments of the present invention.

Referring to FIG. 12, operations for joining optoelectronic components such that the optoelectronic components are optically coupled according to other embodiments of the present invention are illustrated. Optoelectronic components are initially positioned in adjacent relationship such that light signals can pass therebetween (Block 300). A curable resin having adhesive properties is applied to an interface of the optoelectronic components (Block 310). Light signals are then passed between the optoelectronic components (Block 320) such that the optoelectronic components can be aligned relative to each other. Alignment operations include, detecting signal strength of the light signals passing between the optoelectronic components (Block 330), and moving the optoelectronic components relative to each other until signal strength of the light signals passing between the optoelectronic components is detected as being substantially maximized (Block 340).

In response to detecting that signal strength of the light signals passing between the optoelectronic components is substantially maximized, the interface is irradiated with microwave energy (or via RF/microwave fixed and/or variable frequency energy, or via various applicators described herein such as RF stray field applicators, capacitive heating applicators, VFM applicators, and single mode RF/microwave applicators) for a first period of time to partially cure the resin (Block 350) such that the optoelectronic components are sufficiently attached to each other so that they can be transported to a curing oven without becoming separated. The joined components are then transferred to a curing oven (Block 360) to fully cure the adhesive resin via conventional techniques or via RF/microwave fixed and/or variable frequency energy via the various applicators described herein (i.e., RF stray field applicator, capacitive heating applicator, VFM applicator, and single mode RF/microwave applicator) (Block 370).

According to embodiments of the present invention, a curing oven may be a conventional thermal oven, and the partially cured adhesive resin may be subjected to thermal heating at a predetermined temperature for a predetermined period of time. According to embodiments of the present invention, a curing oven may include a capacitive heating device, and the partially cured adhesive resin may be subjected to energy generated between a pair of parallel capacitive plates. According to embodiments of the present invention, the curing oven may include one or more stray field electrodes, and the partially cured adhesive resin may be subjected to a stray field of radio frequency (RF) energy.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of joining optoelectronic components such that the optoelectronic components are optically coupled, comprising:

positioning first and second optoelectronic components in adjacent relationship such that light signals can pass therebetween;

applying a curable resin having adhesive properties to an interface of the first and second optoelectronic components;

passing light signals between the first and second optoelectronic components;

aligning the first and second optoelectronic components relative to each other, comprising:

detecting signal strength of the light signals passing between the first and second optoelectronic components; and moving the first and second optoelectronic components relative to each other until signal strength of the light signals passing between the first and second optoelectronic components is detected as being substantially maximized;

irradiating the interface with electromagnetic radiation to rapidly cure the resin in response to detecting that signal strength of the light signals passing between the first and second optoelectronic components is substantially maximized such that the aligned first and second optoelectronic components are fixedly joined; and heating portions of the first and/or second optoelectronic components substantially simultaneously with irradiating the interface with electromagnetic radiation to facilitate curing of the resin.

2. The method of claim 1, wherein the first optoelectronic component comprises a first optical fiber.

3. The method of claim 2, wherein the second optoelectronic component comprises a second optical fiber, and wherein the first and second optical fibers are positioned in adjacent end-to-end relationship.

4. The method of claim 2, wherein the second optoelectronic component comprises an active region, and wherein positioning the first and second optoelectronic components comprises positioning an end of the first optical fiber in adjacent relationship with the second optoelectronic component active region.

5. The method of claim 1, wherein irradiating the interface with electromagnetic radiation comprises sweeping the interface with at least one range of microwave frequencies selected to rapidly cure the resin.

6. The method of claim 5, wherein sweeping the interface with at least one range of microwave frequencies is performed for a period of time no greater than about 600 seconds.

7. The method of claim 5, wherein the at least one range of microwave frequencies comprises a plurality of ranges of microwave frequencies.

8. The method of claim 1, wherein irradiating the interface with electromagnetic radiation comprises directing a stray field of radio frequency (RF) energy toward the interface.

9. The method of claim 1, wherein irradiating the interface with electromagnetic radiation comprises subjecting the interface to electromagnetic radiation generated by a pair of capacitive plates.

10. The method of claim 1, wherein aligning the first and second optoelectronic components relative to each other is performed via a positioning apparatus configured to move the first and second optoelectronic components relative to each other in one or more of six degrees of freedom.

11. The method of claim 10, wherein the positioning apparatus comprises susceptor material that is configured to heat to a predetermined temperature in the presence of electromagnetic radiation and wherein irradiating the interface with electromagnetic radiation causes the susceptor material to heat to the predetermined temperature which, in turn, heats portions of the first and/or second optoelectronic components to a predetermined temperature.

12. The method of claim 11, wherein the susceptor material is a fluid contained within one or more portions of the positioning apparatus.

13. The method of claim 1, further comprising testing optical alignment of the first and second optoelectronic components after irradiating the interface with microwave energy to determine if signal strength of light signals passing between the first and second optoelectronic components remains substantially maximized.

14. The method of claim 13, wherein testing optical alignment of the first and second optoelectronic components is performed substantially simultaneously with irradiating the interface with electromagnetic radiation.

15. The method of claim 1, wherein irradiating the interface with electromagnetic radiation comprises exposing the interface to fixed frequency microwave energy selected to rapidly cure the resin.

16. A method of joining optoelectronic components such that the optoelectronic components are optically coupled, comprising:
    positioning first and second optoelectronic components in adjacent relationship such that light signals can pass therebetween;
    passing light signals between the first and second optoelectronic components;
    aligning the first and second optoelectronic components relative to each other, comprising:
    detecting signal strength of the light signals passing between the first and second optoelectronic components; and
    moving the first and second optoelectronic components relative to each other until signal strength of the light signals passing between the first and second optoelectronic components is detected as being substantially maximized; and
    applying a curable resin having adhesive properties to an interface of the first and second optoelectronic components;
    irradiating the interface with electromagnetic radiation to partially cure the resin in response to detecting that signal strength of the light signals passing between the first and second optoelectronic components is substantially maximized, wherein portions of the first and/or second optoelectronic components are heated substantially simultaneously with irradiating the interface to facilitate curing of the resin;
    transporting the coupled first and second optoelectronic components to a curing oven; and
    subjecting the partially cured resin to conditions sufficient to fully cure the resin.

17. The method of claim 16, wherein the curing oven comprises a convection heat oven, and wherein subjecting the partially cured resin to conditions sufficient to fully cure the resin comprises heating the resin to a predetermined temperature for a predetermined period of time.

18. The method of claim 16, wherein the curing oven comprises a microwave cavity, and wherein subjecting the partially cured resin to conditions sufficient to fully cure the resin comprises irradiating the resin with microwave energy.

19. The method of claim 18, wherein irradiating the resin with microwave energy comprises exposing the resin to fixed frequency microwave energy.

20. The method of claim 18, wherein irradiating the resin with microwave energy comprises sweeping the resin with at least one range of microwave frequencies.

21. The method of claim 20, wherein the at least one range of microwave frequencies comprises a plurality of ranges of microwave frequencies.

22. The method of claim 16, wherein the curing oven comprises a capacitive heating device having interchangeable capacitive plates, and wherein subjecting the partially cured resin to conditions sufficient to fully cure the resin comprises capacitively heating the resin between the interchangeable capacitive plates.

23. The method of claim 16, wherein the curing oven comprises one or more stray field electrodes, and wherein subjecting the partially cured resin to conditions sufficient to fully cure the resin comprises directing a stray field of radio frequency (RE) energy to the resin.

24. The method of claim 16, wherein the first optoelectronic component comprises a first optical fiber.

25. The method of claim 16, wherein the second optoelectronic component comprises a second optical fiber, and wherein the first and second optical fibers are positioned in adjacent end-to-end relationship.

26. The method of claim 16, wherein the second optoelectronic component comprises an active region, and wherein positioning first and second optoelectronic components comprises positioning an end of the first optical fiber in adjacent relationship with the second optoelectronic component active region.

27. The method of claim 16, wherein aligning the first and second optoelectronic components relative to each other is performed via a positioning apparatus configured to move the first and second optoelectronic components relative to each other in one or more of six degrees of freedom.

28. The method of claim 27, wherein the positioning apparatus comprises susceptor material that is configured to heat to a predetermined temperature in the presence of electromagnetic radiation and wherein irradiating the interface with electromagnetic radiation causes the susceptor material to heat to the predetermined temperature which, in turn, heats portions of the first and/or second optoelectronic components to a predetermined temperature.

29. A method of joining optoelectronic components such that the optoelectronic components are optically coupled, comprising:
    positioning first and second optoelectronic components in adjacent relationship such that light signals can pass therebetween;
    applying a curable resin having adhesive properties to an interface of the first and second optoelectronic components;
    aligning the first and second optoelectronic components relative to each other; irradiating the interface with electromagnetic radiation for a first period of time to partially cure the resin, wherein portions of the first and/or second optoelectronic components are heated substantially simultaneously with irradiating the interface to facilitate curing of the resin;
    checking alignment of the first and second optoelectronic components relative to each other and, if required, aligning the first and second optoelectronic components relative to each other; and
    irradiating the interface with electromagnetic radiation for a second period of time to further cure the resin.

30. The method of claim 29, wherein the step of aligning the first and second optoelectronic components relative to each other comprises:
- passing light signals between the first and second optoelectronic components;
- detecting signal strength of the light signals passing between the first and second optoelectronic components; and
- moving the first and second optoelectronic components relative to each other until signal strength of the light signals passing between the first and second optoelectronic components is detected as being substantially maximized.

31. The method of claim 12, wherein the step of checking alignment of the first and second optoelectronic components relative to each other comprises:
- passing light signals between the first and second optoelectronic components; and
- detecting signal strength of the light signals passing between the first and second optoelectronic components.

32. The method of claim 29, wherein the first optoelectronic component comprises a first optical fiber.

33. The method of claim 29, wherein the second optoelectronic component comprises a second optical fiber, and wherein the first and second optical fibers are positioned in adjacent end-to-end relationship.

34. The method of claim 29, wherein the second optoelectronic component comprises an active region, and wherein positioning the first and second optoelectronic components comprises positioning an end of the first optical fiber in adjacent relationship with the second optoelectronic component active region.

35. The method of claim 29, wherein irradiating the interface with electromagnetic radiation comprises sweeping the interface with at least one range of microwave frequencies selected to rapidly cure the resin.

36. The method of claim 35, wherein sweeping the interface with at least one range of microwave frequencies is performed for a period of time no greater than about 600 seconds.

37. The method of claim 29, wherein the at least one range of microwave frequencies comprises a plurality of ranges of microwave frequencies.

38. The method of claim 29, wherein the steps of irradiating the interface with electromagnetic radiation for first and second periods of time comprises capacitively heating the resin.

39. The method of claim 29, wherein the steps of irradiating the interface with electromagnetic radiation for first and second periods of time comprises directing a stray field of radio frequency (RF) energy to the resin.

40. The method of claim 29, wherein aligning the first and second optoelectronic components relative to each other is performed via a positioning apparatus configured to move the first and second optoelectronic components relative to each other in one or more of six degrees of freedom.

41. The method of claim 40, wherein the positioning apparatus comprises susceptor material that is configured to heat to a predetermined temperature in the presence of electromagnetic radiation and wherein irradiating the interface with electromagnetic radiation causes the susceptor material to heat to the predetermined temperature which, in turn, heats portions of the first and/or second optoelectronic components to a predetermined temperature.

42. The method of claim 29, wherein irradiating the interface with electromagnetic radiation comprises exposing the interface to fixed frequency microwave energy selected to rapidly cure the resin.

43. A method of joining optoelectronic components such that the optoelectronic components are optically coupled, comprising:
- positioning first and second optoelectronic components in adjacent relationship such that light signals can pass therebetween;
- applying a curable resin having adhesive properties to an interface of the first and second optoelectronic components;
- passing light signals between the first and second optoelectronic components;
- aligning the first and second optoelectronic components relative to each other, comprising:
  - detecting signal strength of the tight signals passing between the first and second optoelectronic components; and
  - moving the first and second optoelectronic components relative to each other, via a positioning apparatus configured to move the first and second optoelectronic components relative to each other in one or more of six degrees of freedom, until signal strength of the light signals passing between the first and second optoelectronic components is detected as being substantially maximized; and
- irradiating the interface with electromagnetic radiation to rapidly cure the resin in response to detecting that signal strength of the light signals passing between the first and second optoelectronic components is substantially maximized such that the aligned first and second optoelectronic components are fixedly joined;
- wherein the positioning apparatus comprises susceptor material that is configured to heat to a predetermined temperature in the presence of electromagnetic radiation and wherein irradiating the interface with electromagnetic radiation causes the susceptor material to heat to the predetermined temperature which, in turn, heats portions of the first and/or second optoelectronic components to a predetermined temperature.

44. The method of claim 43, wherein the first optoelectronic component comprises a first optical fiber.

45. The method of claim 44, wherein the second optoelectronic component comprises a second optical fiber, and wherein the first and second optical fibers are positioned in adjacent end-to-end relationship.

46. The method of claim 44, wherein the second optoelectronic component comprises an active region, and wherein positioning the first and second optoelectronic components comprises positioning an end of the first optical fiber in adjacent relationship with the second optoelectronic component active region.

47. The method of claim 43, wherein irradiating the interface with electromagnetic radiation comprises sweeping the interface with at least one range of microwave frequencies selected to rapidly cure the resin.

48. The method of claim 47, wherein sweeping the interface with at least one range of microwave frequencies is performed for a period of time no greater than about 600 seconds.

49. The method of claim 47, wherein the at least one range of microwave frequencies comprises a plurality of ranges of microwave frequencies.

50. The method of claim 43, wherein irradiating the interface with electromagnetic radiation comprises directing a stray field of radio frequency (RE) energy toward the interface.

51. The method of claim 43, wherein irradiating the interface with electromagnetic radiation comprises subjecting the interface to electromagnetic radiation generated by a pair of capacitive plates.

52. The method of claim 43, further comprising testing optical alignment of the first and second optoelectronic components after irradiating the interface with microwave energy to determine if signal strength of light signals passing between the first and second optoelectronic components remains substantially maximized.

53. The method of claim 52, wherein testing optical alignment of the first and second optoelectronic components is performed substantially simultaneously with irradiating the interface with electromagnetic radiation.

54. The method of claim 43, further comprising heating portions of the first and/or second optoelectronic components substantially simultaneously with irradiating the interface with electromagnetic radiation to facilitate curing of the resin.

55. The method of claim 43, wherein the susceptor material is a fluid contained within one or more portions of the positioning apparatus.

* * * * *

UNITED STATES PATENT AND TRADEMARK OFFICE
CERTIFICATE OF CORRECTION

PATENT NO. : 6,758,609 B2
DATED : July 6, 2004
INVENTOR(S) : Fathi et al.

It is certified that error appears in the above-identified patent and that said Letters Patent is hereby corrected as shown below:

Column 19,
Line 14, should read -- 31. The method of claim 26, wherein the step of checking --

Signed and Sealed this

Seventh Day of December, 2004

JON W. DUDAS
*Director of the United States Patent and Trademark Office*